Aug. 24, 1937.  C. W. HALL  2,090,627
SEALING RING
Filed April 7, 1936
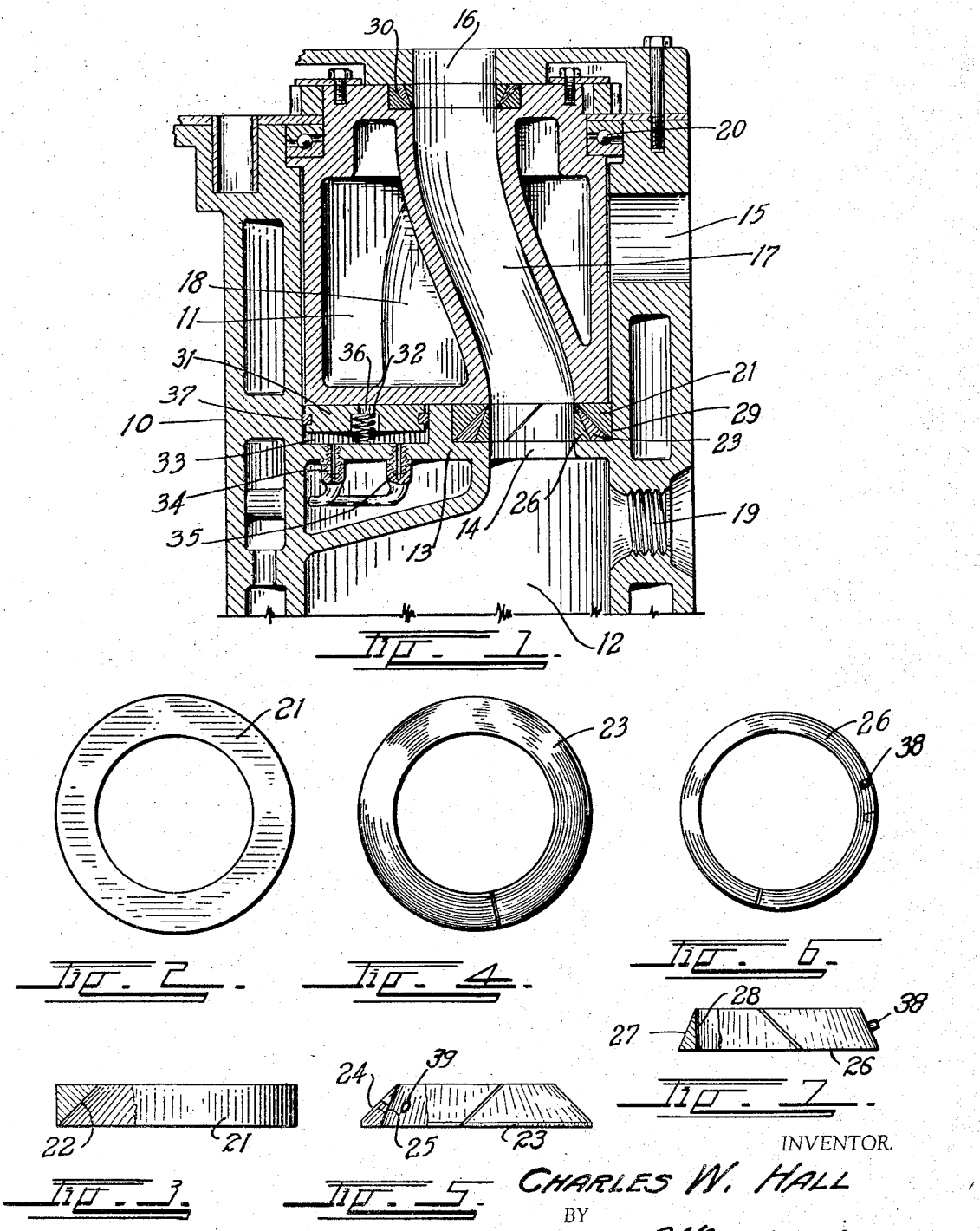
INVENTOR.
CHARLES W. HALL
BY
ATTORNEY.

Patented Aug. 24, 1937

2,090,627

UNITED STATES PATENT OFFICE 2,090,627

SEALING RING

Charles W. Hall, Denver, Colo., assignor to The Hall Rotary Valve Motor Co., Denver, Colo.

Application April 7, 1936, Serial No. 73,061

5 Claims. (Cl. 123—80)

This invention relates to rotary valves for internal combustion engines, and relates more particular to means for sealing said valves against the escape of gases and to the lubrication of such valves.

The invention is particularly designed to seal valves of the type illustrated in applicant's Patent No. 1,996,200; and while particularly efficacious with this particular type of valve, it is of course, not limited to this particular use.

The principal object of this invention is to provide a sealing ring for the ports of a rotary valve which will have a longitudinal expansion so as to continuously maintain itself tight against said valve and so that all sealing surfaces will be of relatively large area and automatically held in sealing contact.

A further object is to so construct the ring that pressure of the gases sealed against will assist the ring in maintaining the seal.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a vertical section through a rotary valve of the type illustrated in applicant's Patent No. 1,996,200, illustrating the improved sealing ring and lubricator in place on the valve.

Fig. 2 is a plan view of the solid ring portion of the sealing ring.

Fig. 3 is a side elevation thereof, partly in section.

Fig. 4 is a similar plan view of the middle expansion ring of the sealing ring.

Fig. 5 is a combined side elevation and section thereof.

Fig. 6 is a plan view of the inner expansion ring of the sealing ring.

Fig. 7 is a side elevation and section thereof.

In Fig. 1, typical parts of a rotary valve engine are illustrated for the purpose of showing the application of the sealing ring and lubricator of this invention. These parts are designated by numerals as follows: cylinder block 10, rotary valve 11, cylinder 12, cylinder head 13, cylinder port 14, intake port 15, exhaust port 16, exhaust valve passage 17, intake valve passage 18, spark plug opening 19, and valve thrust bearing 20.

Briefly, the valve 11 is rotated in any suitable manner, and alternately places the intake passage 18 between the ports 14 and 15, and the exhaust passage 17 between the ports 14 and 16. It has been exceedingly difficult to seal the passages 17 and 18 to the port 14, so as to prevent the exhaust gases from leaking to the intake passage 18 and loss of compression from the cylinder 12 about the valve 11. This invention contemplates a novel sealing ring for sealing against the escape of gas at this point.

The sealing ring consists of an outer solid ring 21 having an inner bevelled sealing face 22. The inner face is conical, and is positioned substantially at 45° to the axis of the ring. This produces right-isosceles, triangular ring section, as shown in Fig. 3.

A conical, split middle ring 23 is positioned within the ring 21. The ring 23 is wedge-shaped in cross section, having an outer surface 24 of the proper angle to fit against the inner surface 22 of the ring 21, and a bevelled inner surface 25 forming a conical seat within the ring 23.

An expansible inner ring 26 is positioned within the ring 23. The ring 26 has a bevelled outer surface 27 of the proper angle to fit snugly against the inner surface 25 of the ring 23. The inner surface of the ring, shown at 28, is cylindrical about the axis of the complete ring. The two inner rings 23 and 26 may be pinned together to maintain their splits in staggered relation by means of a pin 38 and pin hole 39 as is usual in sealing ring practice.

The apex edges of the rings 23 and 26 are slightly compressed when in working position within the ring 21. The complete, assembled sealing ring is fitted into a suitable counter-bore 29 about the cylinder port 14.

It can be readily seen that the inherent expansion of the ring 26 will force its inclined face 27 against the inclined faces 25 of the ring 23, and a similar expansion of the ring 23 will force its face 24 against the surface 22 of the ring 21. This combined expansive action not only seals these contacting surfaces against the passage of gas, but also acts to force the ring 21 upwardly against the bottom face of the valve 11 and similarly forces the bottom faces of the rings 23 and 26 against the bottom of the counter-bore 29, above, below or through the sealing ring. A similar use of the ring may be made at the top of the valve 11, as shown at 30.

The lubricating portion of the device comprises a rotary button 31 which is constantly forced against the bottom of the valve 11 by means of a compression spring 32. The button 31 is seated in a cylindrical concavity 32 in the cylinder head 13, and is constantly supplied with oil from an oil supply conduit 34. It is preferred to provide an oil discharge conduit 35 so that a constant circulation of oil is provided through the concavity 32. This oil feeds upwardly through a port 36 in the button to lubricate the top of the button 31 and, through it, lubricate the bottom of the valve 11. The button rotates as the valve 11 rotates, due to its varying radial contact therewith. To prevent excess oil from escaping around the periphery of the button 31, a suitable sealing ring 37 is provided completely surrounding the button.

It is desired to call attention to the fact that the sealing is not only accomplished by the inherent expansibility of the split rings 23 and 26. This sealing is also facilitated by the internal pressure of the gases within the ring. This pressure acts against the inner face 28 of the ring 26 to assist in the expanding action of the complete assembly.

Two of the inner split rings have been found most satisfactory. It is conceivable however, that more than two could be used without altering the principle involved.

Other objects and advantages reside in the detail construction of the invention, which is designed for simplicity, economy, and efficiency. These will become more apparent from the following description.

Having thus described the invention, what is claimed and desired secured by Letters Patent is:

1. A sealing ring for rotary valve engines comprising: an outer solid ring having a conical inner face; a first triangular split ring expanding against said conical inner face, said split ring providing a second conical inner face; and a third conical split ring expanding against said second conical inner face, the expansion of said split rings acting to increase the axial width of the entire assembly.

2. A sealing ring for rotary valve engines comprising: an outer solid ring having a right-isosceles triangular cross section, its outer face being at right angles to its top and its inner face being bevelled at an angle of substantially 45°; an intermediate split ring expanding against the bevelled inner face of said outer ring, said intermediate ring having an outer face bevelled to correspond to the inner bevel on said solid ring and an inner face of lesser bevel; and an inner ring having an outer face corresponding to the lesser bevel of the inner face of said intermediate ring and having an inner face parallel to the outer face of said outer solid ring.

3. A sealing ring for rotary valve engines comprising; an outer solid ring having a conical inner face and a composite split ring assembly cooperating with and expanding against the conical inner face of said solid ring; said assembly comprising a plurality of triangular split ring elements having interengaging faces nested with their bases in a common plane and their apices converging to a common point, whereby the expansion of the separate split ring elements is combined to act against the conical face of said outer ring to increase the axial width of the entire assembly.

4. A sealing ring for rotary valve engines comprising; an outer solid ring having a right-isosceles triangular cross section, its outer face being at right angles to its top and its inner face being bevelled at an angle of substantially forty-five degrees, and a composite split ring assembly cooperating with and expanding against the bevelled inner face of said outer ring; said composite assembly comprising a plurality of split ring elements nested through interengagement of corresponding conical faces with their bases in a common plane and their apices converging to a common point to form a unit having an outer face corresponding to the bevelled face on said solid ring, an inner face parallel with the outer face of said solid ring, and a base parallel with the top of said solid ring; whereby the expansion of the separate split ring elements is combined in a force acting against the bevelled face of said solid ring to increase the axial width of the entire assembly.

5. In a sealing ring for rotary valve engines having an outer solid ring formed with a conical inner face, a composite split ring assembly cooperating with and expanding against the conical inner face of said solid ring; said composite ring assembly comprising a plurality of triangular split ring elements nested through interengagement of corresponding conical faces with their bases in a common plane and their apices converging to a common point to form a unit wherethrough the expansion of the separate ring elements is combined in a force acting against the conical inner face of said solid inner ring to increase the axial width of the entire assembly.

CHARLES W. HALL.